April 4, 1961 D. H. HOWLING 2,978,545

MAGNETIC PLAYBACK HEADS

Filed Oct. 15, 1956

INVENTOR.
Dennis H. Howling
By: George H. Fritzinger
Agt.

2,978,545

MAGNETIC PLAYBACK HEADS

Dennis H. Howling, West Orange, N.J., assignor, by mesne assignments, to McGraw-Edison Company, Elgin, Ill., a corporation of Delaware Filed Oct. 15, 1956, Ser. No. 616,005

1 Claim. (Cl. 179—100.2)

This invention relates to novel forms of magnetic playback heads which are sensitive only to the magnitude of the flux derived from the record medium, such heads being herein referred to as being of the flux-sensitive type.

The conventional playback head is one which responds according to the rate of change of the flux received from the record medium, and accordingly it has a voltage output dependent both on record speed and frequency of the recorded signal. Since the present heads respond to the flux itself, their voltage output does not depend in useful frequency ranges either on record speed or frequency of the recorded signal. These differences in the present heads over those of the conventional type provide for an improved operation, especially a greater signal-to-noise ratio at low tape transport velocities, which has the benefit of enabling the pick-up of recorded signals of greater recording density than is possible with the conventional heads.

In recording and reproducing systems using conventional heads operating on a magnetic tape, the ratio of recorded-signal to record-medium noise is independent of the tape speed because the magnitude of both signal and record noise varies alike with the speed of the tape. The record noise is not, however, the main source of noise in recording and reproducing equipment; rather, the more or less constant system noise from the electronic amplifier is typically much higher than the tape record noise at standard tape speeds. Thus, with conventional heads the ratio of recorded-signal to system noise will vary with the tape speed and will have its lowest value at the lowest frequency of the useful frequency spectrum. Attempts to increase the density of signal recorded on a tape with conventional heads is limited therefore by the minimum ratio of signal to system noise which can be tolerated at the low end of the useful frequency spectrum.

The present flux-sensitive head, by having an output voltage independent of tape speed and frequency of recorded signal, permits the maximum ratio of signal to system noise to be attained at any tape speed. This head permits therefore the recording of greater density of signal through use of lower tape speeds than is permissible with conventional heads. Flux-sensitive heads of the present type employ semiconductor plates using the so-called Hall effect, such plates being hereinafter referred to as Hall plates.

Objects of my invention are to provide novel playback heads overcoming the limitations inherent in conventional playback heads, in providing novel playback heads whose output depends on the recorded flux itself and not on the record speed or the frequency of the recorded signal, and to provide such heads which have a greater ratio of recorded signal to system noise than do conventional heads when operated at low tape speeds necessary for the recording of high densities of information.

Three types of flux-sensitive heads are herein described each employing a Hall plate: (1) a ring head with the Hall plate in the back gap, (2) a Hall plate in direct contact with the record medium with an associated magnetic material overlying one or both faces of the plate, and (3) a Hall plate in contact with the record medium without the use of any associated magnetic material.

These and other objects and features of my invention will be apparent from the following description and the appended claim.

In the description of my invention reference is had to the accompanying drawings, of which:

Figures 2, 2A, 2B:
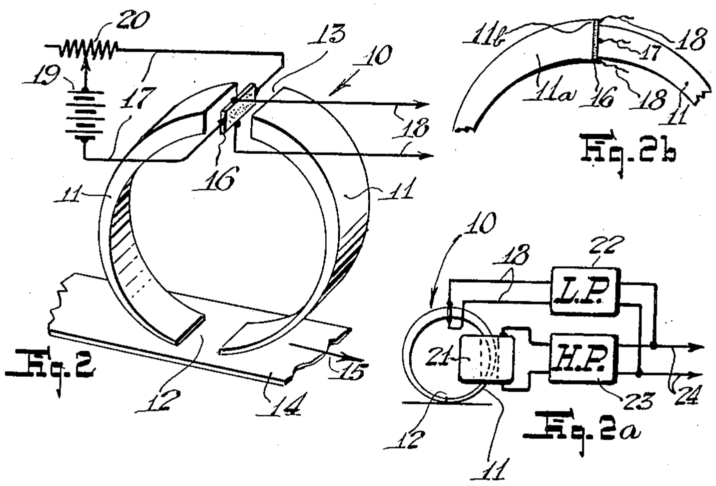
Figure 2 is an enlarged exploded perspective view of this ring-type magnetic playback head.
Figures 5, 6, 7:
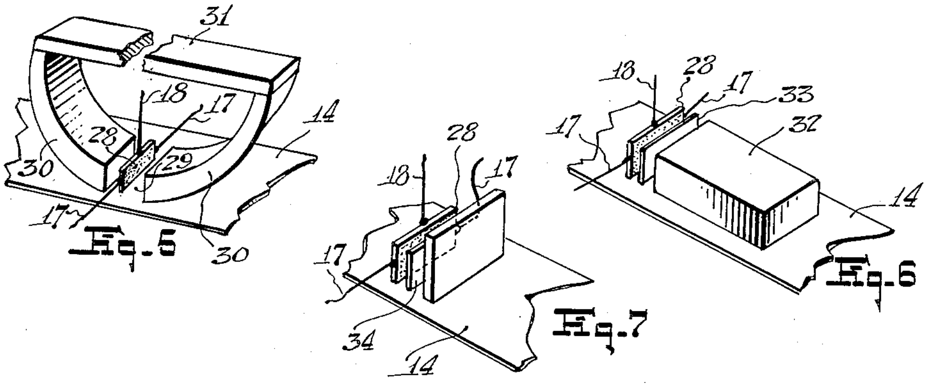
Figure 8:
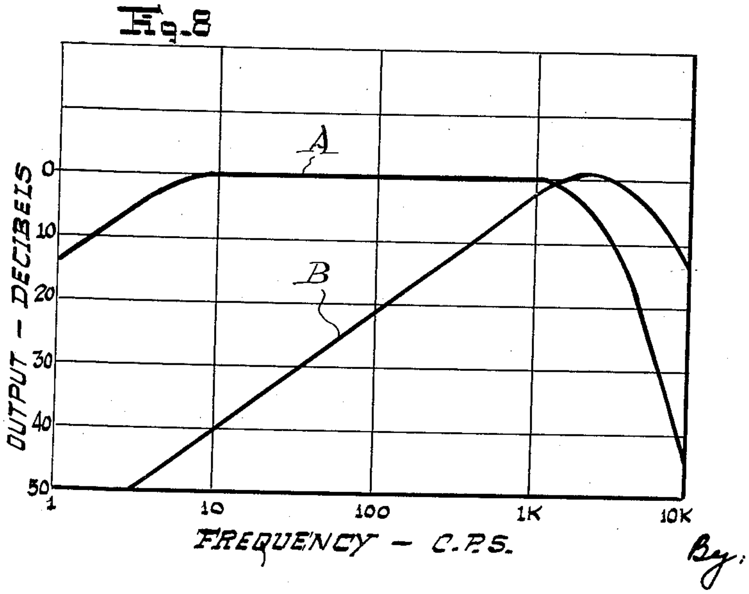
Figure 3:
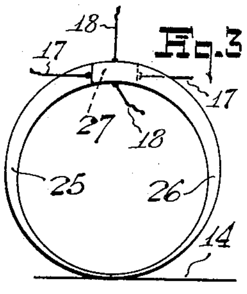
Figure 4:
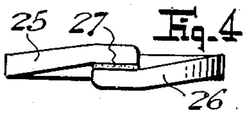

Figure 2*a* is a side elevational view of the above ring-type flux-sensitive head embodying also a pick-up coil with a crossover network to enable the head to function as a flux-sensitive one below a predetermined crossover frequency and as a conventional head above that frequency;

Figure 2*b* is a fractional showing of a ring-type flux-sensitive magnetic playback head showing a modification according to my invention;

Figure 3 is a side elevational view of another form of ring-type flux-sensitive magnetic playback head according to my invention;

Figure 4 is a top plan view of the head shown in Figure 3;

Figure 5 is an exploded perspective view of a form of flux-sensitive magnetic playback head according to my invention using a Hall plate in direct contact with the record medium and magnetic material at each side of the Hall plate;

Figure 6 is an exploded perspective view of another form of flux-sensitive magnetic playback head differing particularly from the foregoing embodiment by using magnetic material at only one side of the Hall plate;

Figure 7 is an exploded perspective view of another embodiment of my invention using a Hall plate in direct contact with the record medium but without the use of any associated magnetic material; and Figure 8 shows certain typical frequency response curves for a ring-type flux-sensitive head and for a conventional head.

Figure 1:
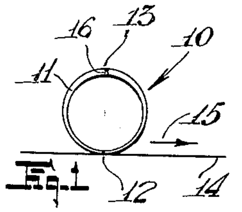
Figure 1 is a side elevational view of a ring-type flux-sensitive magnetic playback head using a Hall plate in the back gap according to one embodiment of my invention.

In the embodiment of Figures 1 and 2, the magnetic playback head 10 comprises a magnetic ring 11, preferably of crescent shape and made of a magnetic material of low residual induction, such as hydrogen annealed Mumetal. This magnetic ring is provided in two equal sections having diametrically opposite front and back gaps 12 and 13 located respectively at points of minimum and maximum cross section of the ring. The head is mounted with its front gap 12 crosswise to and in contact with the record medium, which may for example be a magnetic tape 14 of the usual form comprising a coat of magnetizable particles on a non-magnetic backing film, it being understood that the tape is driven in its lengthwise direction as indicated by the arrow 15. Interposed in the back gap 13 is a Hall plate 16 of a suitable semiconductor, preferably indium antimonide. This Hall plate may be made by cutting and lapping operations, or by chemical deposition or vacuum evacuation or sputtering on thin insulating plates such as of mica. Such Hall plate is clamped between the adjacent faces of the magnetic ring sections with suitable interposition of electrically insulating films such as of mica of about .3 mil thickness or insulating films formed by spraying, evaporating or other depositing such as of silica or mica on the sides of the Hall plate or on the pole faces of the ring 11.

The magnetic flux picked up from the magnetic tape 14 is directed linearly by the ring sections through the Hall plate. It is well known that when a magnetic field of density B is applied across a Hall plate and an energizing current I is passed through the plate along an axis in the plane of the plate, the plate will develop an output voltage V along an orthogonal axis in the plane of the plate according to the equation $$V=\frac{RBI}{t}$$

where R is the Hall coefficient of the particular plate for a thickness $t$ measured in the direction of the magnetic field.

For purposes of making necessary circuit connections to the Hall plate, thin copper wires of for example 42 gauge are soldered to the respective edges of the plate as with the use of tin, lead solder and a suitable soldering flux. Alternatively, lead connection may be made by welding, spring loading or preforming onto silver contacts. Also, thin metal foil of about .1 mil thickness may be suitably applied along the edges of the plate to make the lead connections. Alternatively, one pole section 11*a* may be made larger in cross section than the other, as indicated in Figure 2*b*, so that the end face at the back gap will have overhanging edges 11*b* supporting the edges of the Hall plate 16 to allow lead connections to be made to the side face of the Hall plate at the edges thereof. Two lead wires 17 are connected to opposite edges of the Hall plate for passing the energizng current I therethrough, and two other leads 18 are connected to the remaining opposite edges for leading off the developed voltage V. Preferably, the Hall plate is made so that its dimension in the direction of the energizing current is about three times greater than its dimention in the direction of its output voltage. The current I may be supplied from a D.C. voltage source such a battery 19 through a rheostat 20 for current control purposes. Alternatively, the voltage source may be A.C., in which case the head operates as an amplitude modulated carrier—i.e., its output is an alternating voltage modulated according to the product of the field density B and energizing current I. The Hall plate should be as thin as possible so that the back gap can be at a minimum to enable the maximum amount of magnetic flux to be picked up and passed through the plate from the tape. As the dimension of the back gap is so reduced, the output voltage is increased, as is also the signal-to-system-noise ratio. The high frequency response of the head is not affected by the thickness of the Hall plate inserted into the back gap but is dependent upon the front gap the same as with conventional ring-type heads. Flux-sensitive heads of this ring-type construction using a .5 mil back gap and a .25 mil front gap will produce a ratio of signal to system noise of as high as 60 db from tapes recorded 6 db below saturation and having 5000 c.p.s. noise band width. In contrast, the best such ratios obtainable from other types of flux-sensitive heads is of the order of only 40 to 50 db.

Test results show that the magnitude of the noise inherent in the Hall plate itself, referred to herein as current noise, depends largely on the material and the surface condition of the Hall plate. For example, in the case of a germanium semiconductor, a plate which is lapped or sand blasted has about 10 db less current noise than one having an etched surface. However, the current noise from Hall plates made of indium antimonide is much lower than the system noise and therefore causes no reduction in the signal-to-noise ratio actually observed.

As a typical example, the indium antimonide Hall plate in the ring-type head shown in Figures 1 and 2 may be from 1 to 2 mils in thickness, ⅛ to ¼ inch in width and about ⅓ of its width dimension in height. Such a plate will typically have a resistance of the order of 4 ohms and may be energized by a current of about 50 milliamperes, which is equivalent to about .01 watt. The sides of the plate or the confronting faces of the ring sections are covered with a thin layer of electrical insultion as by spraying with a suitable varnish. The cross sectional dimensions of the ring at the back gap correspond to the width and height dimensions of the Hall plate. At the front gap the cross sectional dimensions of the rings are likewise the same in width as at the back gap but are only about .010 inch high. The length of the front gap is made as small as possible to get maximum high-frequency response, it being preferably not more than .5 mil. The ring is made, for example, of hydrogen annealed Mumetal and may have an outside diameter of ¾ inch.

A flux-sensitive head of the ring type above described has a frequency response characteristic substantially as shown by curve A in Figure 8 when the tape is driven at a speed of 7.5 inches per second. By contrast, the frequency response curve for this ring structure with a pick-up coil to operate as a conventional head is as shown by curve B in Figure 8. As is shown, the flux-sensitive head has a substantially flat response to about 1300 c.p.s., and then tapers off because of the finite dimension of the front gap. The conventional head has a response which rises at the rate of 6 db per octave to this same crossover frequency and then likewise tapers off because of the front gap. Since the flux-sensitive head inherently tends to have a flat response and the conventional head a rising response, the output of the flux-sensitive head is better than that of the conventional head in the range below the cross-over frequency by 6 db per octave of that frequency, and the output of the conventional head is better than that of the flux-sensitive head in the range above the cross over frequency by 6 db per octave of that frequency.

In Figure 2*a* the head structure of Figure 2 is shown with the ring 11 passing through a pick-up coil 21 such as in a conventional head structure. The Hall plate feeds into a low pass filter 22 having its cutoff at the crossover frequency and the coil 21 feeds into a high pass filter 23 likewise having its cutoff at the crossover frequency. The filters are connected at their output sides in parallel to a common output circuit 24 for feeding into an electronic amplifier not shown. By this combination of a flux-sensitive head with a conventional flux-change sensitive head, advantageous features of both heads are combined to give a high level output having a flat response characteristic through a wide frequency range.

The embodiment of my invention shown in Figures 3 and 4 is also of the ring type with a Hall plate in the back gap, but differs from the foregoing in that the ring sections 25 and 26 have an overlapping back joint, instead of a butt joint, with a Hall plate 27 interposed between the overlapping portions. This type of construction permits the use of a back gap of larger cross sectional dimensions, with corresponding reduction in the magnetic reluctance of the gap, without increasing the over-all dimensions of the head.

In the embodiment of Figure 5, a Hall plate 28 of indium antimonide is interposed in a gap 29 between two magnetic half pole pieces 30 which are bridged at their outer ends by a non-magnetic bar 31 such as of aluminum. This head structure is placed with the bottom edge of the Hall plate in contact with the magnetic tape 14. The magnetic half pole pieces aid in picking up the flux from the tape and in directing the flux uniformly through the Hall plate. Although a lead connection can be made with the edge of the Hall plate which contacts the tape by the use of a .1 mil foil without effectively increasing the spacing between the plate and the tape—the minimum such spacing achievable in practice being of the order of .3 mil—I herein show the lead connection at the bottom edge of the Hall plate as eliminated to simplify the construction. The output circuit is then connected between the upper lead 18 and one of the circuit leads 17. In so eliminating the bottom connection the high-frequency response is extending—being now limited only by the thickness of the plate and its spacing from the tape—but the sensitivity of the plate is somewhat reduced. Heads of this construction have been measured as having a signal-to-system-noise ratio of as high as 66 db at 100 c.p.s. for a 5000 c.p.s. noise band width and for tape recorded at 6 db below saturation.

In the embodiment of Figure 6, the Hall plate 28 which may be without the bottom lead connection as above described, is mounted on the end face of a magnetic block 32 such as of hydrogen annealed Mumetal. This block extends slidably along the tape 14 in the direction of movement thereof. A thin insulating plate 33 such as of mica is interposed between the Hall plate and magnetic block. The effect of the magnetic block is to improve the over-all sensitivity as well as the low-frequency response.

In the embodiment of Figure 7 the Hall plate 28 is mounted on an insulating sheet 34 such as of mica which in turn is mounted on the side face of a non-magnetic block such as of brass. The lower edge of the Hall plate, which may be again without a lead connection, is in direct contact with the tape at right angles to the direction of travel thereof. This form of head has a somewhat poorer sensitivity than those which have ring or side wings of magnetic material and has a somewhat poorer low-frequency response; however, its high-frequency response is better since the Hall plates used in this construction can be made very thin—1 mil or less—and the high-frequency response is governed only by the thickness of the plate and its effective spacing from the tape. Heads of this construction using a 1 mil thickness of indium antimonide and having an internal resistance of 2 to 3 ohms will provide 800 microvolts output from records recorded 6 db below saturation, and will have signal-to-noise ratios from 60 to 70 db. If the thickness of the Hall plate is increased to 15 mils it will have a current resistance of .9 ohm and may be energized typically with about 180 milliamperes. Such thicker Hall plate in this type of head construction will however have a poorer high-frequency response and also a poorer signal-to-system-noise ratio.

Indium antimonide is herein described as a preferred semiconductor for flux-sensitive heads because it has the highest possible mobility of electrons, it being for example of the order of 20 times greater than that of germanium. When operated as a power device—i.e., when feeding into a low impedance—indium antimonide will produce of the order of 300 times the power available from germanium. When operated as a voltage device—i.e., when feeding into a high impedance—the germanium will deliver the same voltage output as indium antimonide.

The presence of the high-current noise of germanium, however, prevents the attainment of the high signal-to-total-noise ratio that is obtained with indium antimonide. In both forms of operation, i.e., as a power and a voltage device, therefore, indium antimonide gives better results.

The present flux-sensitive heads are ideally suited in applications such as telemetering, geophysics, etc. where low frequencies and low tape speed operation are required. With a D.C. amplifier and a finite wave length recorded on the tape, the head will indicate the amplitude of the recorded signal even when the tape is stationary.

The particular embodiments of my invention herein shown and described are intended to be illustrative and not limitative of my invention since the same are subject to changes and modifications without departure from the scope of my invention, which I endeavor to express according to the following claim.

I claim:

A playback head for reproducing recorded magnetic signals on a moving magnetic record medium, comprising a Hall plate; a rigid member backing at least one face of said Hall plate and secured thereto, said backing member being flush with at least one edge of said plate and being mounted relative to said record medium for holding said one edge of the plate in close proximity with said record medium with the plane of the plate at right angles to the direction of record movement to cause the flux from said record medium to be directed through the plate in the direction of its thickness dimension; and a total of three lead connections to said Hall plate comprising lead connections to the ends of the Hall plate for passing current through said plate along one axis thereof in the plane of the plate and a lead connection to the edge of the Hall plate opposite the edge thereof in proximity to the record medium for receiving between said edge connection and one of said end connections a voltage produced in the plate along the orthogonal axis in the plane of the plate.

References Cited in the file of this patent

UNITED STATES PATENTS

| | | |
|---|---|---|
| 2,553,490 | Wallace | May 15, 1951 |
| 2,702,316 | Friend | Feb. 15, 1955 |
| 2,714,182 | Hewitt | July 26, 1955 |
| 2,736,822 | Dunlop | Feb. 28, 1956 |
| 2,768,243 | Hare | Oct. 23, 1956 |
| 2,866,013 | Reis | Dec. 23, 1958 |
| 2,900,451 | Havstad | Aug. 18, 1959 |
| 2,907,834 | Duinker et al. | Oct. 6, 1959 |